H. F. SMITH.
METHOD IN THE CALORIMETRY OF GASEOUS FUELS.
APPLICATION FILED FEB. 5, 1910.
1,134,768.
Patented Apr. 6, 1915.
2 SHEETS—SHEET 1.
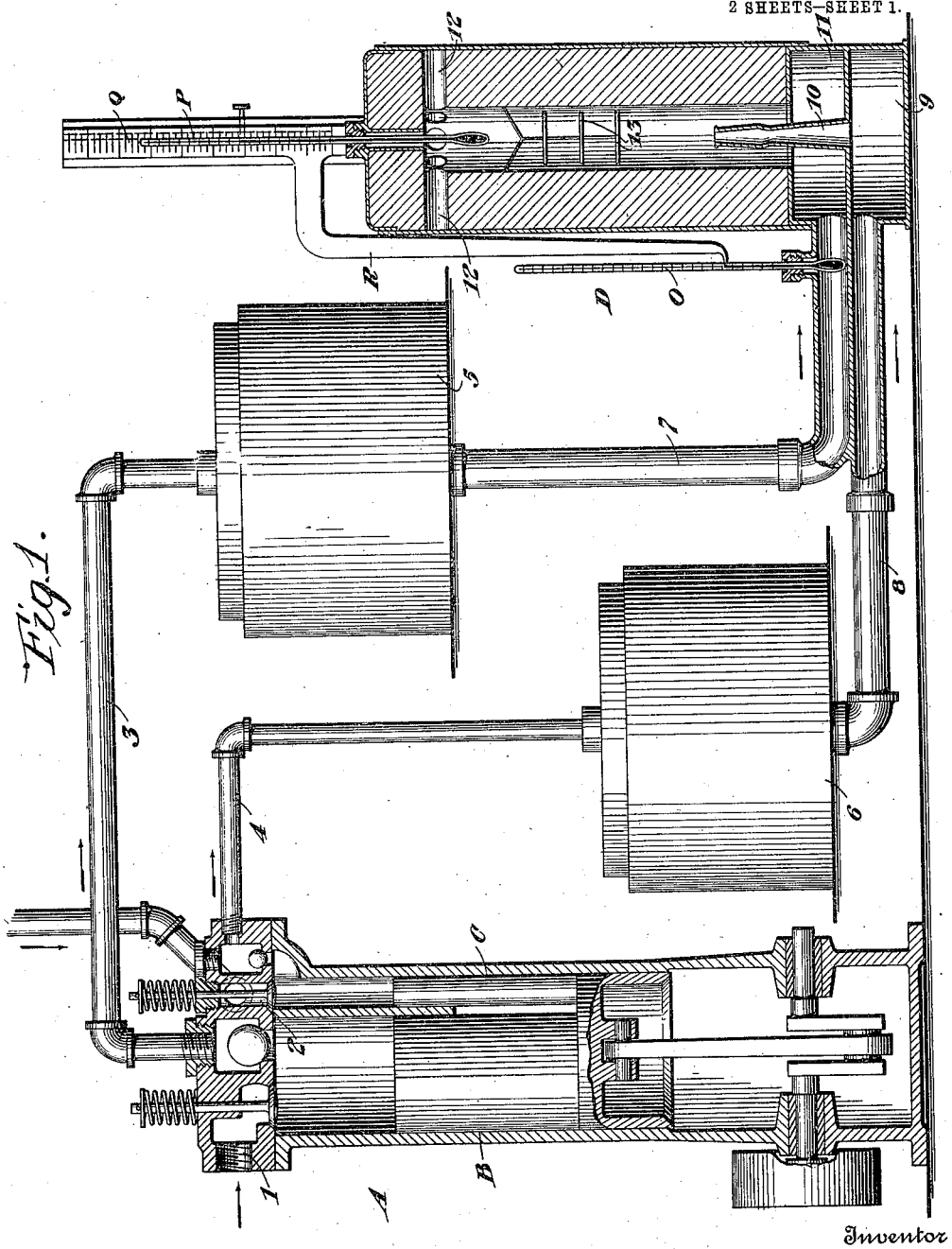

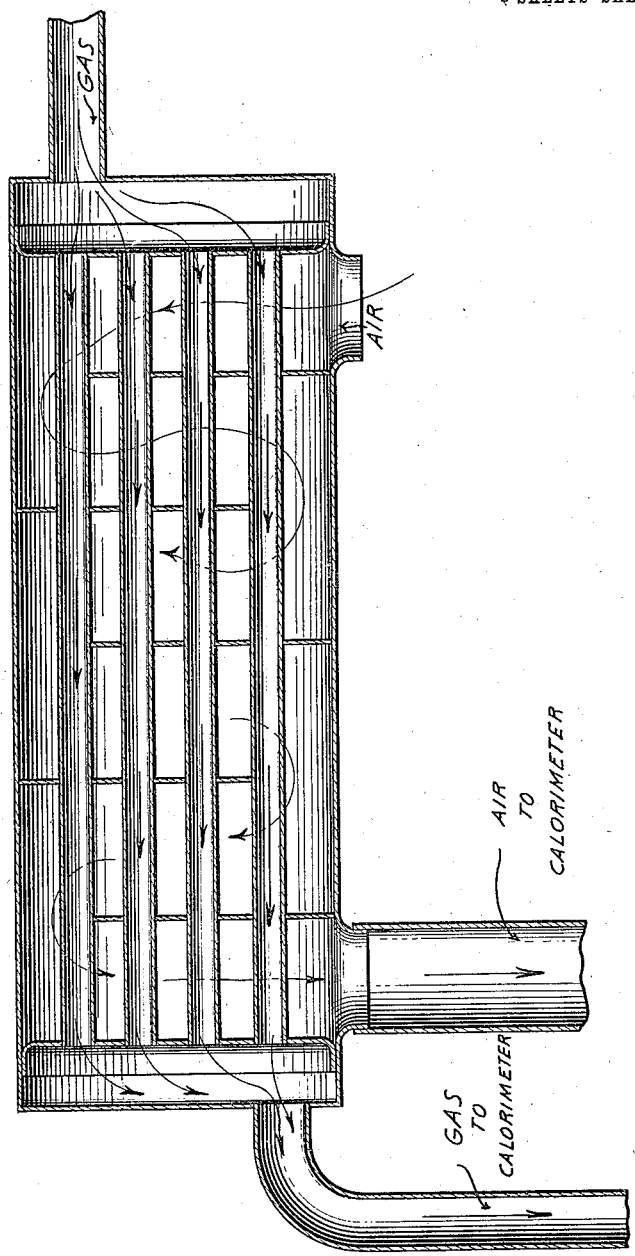

UNITED STATES PATENT OFFICE.

HARRY F. SMITH, OF LEXINGTON, OHIO.

METHOD IN THE CALORIMETRY OF GASEOUS FUELS.

1,134,768.  Specification of Letters Patent.  Patented Apr. 6, 1915.

Application filed February 5, 1910. Serial No. 542,279.

*To all whom it may concern:*

Be it known that I, HARRY F. SMITH, a citizen of the United States, residing at Lexington, in the county of Richland and State of Ohio, have invented certain new and useful Improvements in Methods in the Calorimetry of Gaseous Fuels, of which the following is a specification.

My invention relates to an improvement in method and apparatus in the calorimetry of gaseous fuels the object being to determine the heating value of gaseous fuels by the use of a heat absorbing medium, the gaseous fuel and heat absorbing medium being supplied to a calorimeter under suitable conditions of pressure and temperature and in amounts proportional to each other.

Many devices have been suggested for determining the heating value of gaseous fuel, and many processes employed. The chief among these consists in the use of an instrument containing water which is raised in temperature a measured amount by the heat generated from the combustion in air of a definite measured quantity of the fuel to be tested. The heating value of the gas per cubic foot is determined by calculation from the data secured by this determination. It is characteristic of these instruments to measure the quantity of the gas, but the quantity of air circulated through the instrument is not taken into consideration, it only being necessary or desirable to make certain that the temperature of the ingoing and outgoing air from the instrument is the same. Furthermore, it has been necessary to employ considerable mathematical calculation in order to reduce the results of the readings of these instruments to definite and comparable terms in accordance with the generally accepted standards. For example, the measured quantity of gas consumed must be corrected for deviations in temperature of the gas from the accepted standard temperature, and for deviations in barometric pressure under which the gas is measured from the accepted standard of pressure. It is impossible to calibrate the existing forms of instrument so as to compensate automatically for such variations in temperature and pressure, and it is, as a result of this, unavoidable that considerable mathematical calculation be employed to reduce the results to standard form. It is the object of this invention to make possible the construction of a calorimeter which will avoid the necessity for mathematical corrections of this character, and which will give readings directly in terms of the heating value per cubic foot of gas, under the accepted standard conditions of pressure and temperature, and it will continue after calibration to give practically identical readings under conditions of pressure or temperature different from those under which the instrument has been calibrated.

In order to make an instrument of this kind effective, I have found by extensive experiment that it is necessary to employ as a heat absorbing agent a gaseous or an aeriform substance which will react to variations in pressure and temperature in exactly the same way as the gaseous fuel whose heating value is to be measured. In any calorimeter it is necessary to establish an exact ratio of weight or volume between the gas whose calorific intensity is to be determined and the heat absorbing agent. For example, in calorimeters using water for the heat absorbing agent, it is customary to weigh the water passing through the calorimeter during the period covering the combustion of a fixed quantity of the gaseous fuel. It is likewise necessary for the operation of this process of calorimetry, to establish an exact ratio of volumes between the gas whose calorific intensity is to be determined and the gaseous or aeriform substance which is employed to act as a heat absorbing agent. It is furthermore necessary that the heat absorbing agent have a definite and known specific heat which is practically invariable under the conditions under which the instrument is required to operate. It is a well-known physical fact that air and other gases of similar nature have a definite and determinable specific heat which is practically constant under constant pressure, and which is the same for different pressures, so long as the pressure remains constant during the time the determination is being made. The specific heat of air, for example has been carefully determined by a large number of physicists, and it may be assumed that the specific heat of the air under constant pressure is well established, and a determinable physical property. The availability of air, and the fact that the specific heat of air under constant pressure is a well established and determinable physical property, make it preferable to employ air as the heat absorbing medium in carrying out the application of this invention, although, as previously stated, gases of a similar nature might be employed.

In the accompanying drawing Figure 1 is a view partly in elevation and in section of an apparatus which may be employed in carrying out the invention, but as different forms might be used in carrying out the invention, I do not wish to be limited in any wise to the structure herein set forth. Fig. 2 is a sectional view of an apparatus for bringing the air and gas to the same temperature before delivery to the pump.

In the apparatus disclosed, A represents a pump comprising two cylinders B and C which have exactly the same stroke, and both of which are of definitely proportioned areas. Each cylinder is provided with a piston for compression purposes. A valve-controlled inlet opening, 1, admits the air or heat absorbing medium to the large cylinder B, and a valve-controlled inlet 2 admits the gas to the small cylinder C.

Upon the operation of the piston, the air and gas are forced from the cylinders B and C through the pipes 3 and 4 to the elastic containers 5 and 6 which may be gas bags or gasometers, respectively. The calorimeter D is connected to the containers 5 and 6 by means of pipes 7 and 8, pipe 8 conducting the gas into chamber 9 of the calorimeter to which a burner 10 is connected, and the air is admitted through the pipe 7 to the chamber 11. The gas is ignited and the air and the products of combustion from the gas will pass up through a combustion chamber of the calorimeter and out through openings 12 at the top of the calorimeter. Baffle plates 13 may be placed at intervals for insuring a thorough mixture of the various products of combustion with the air and producing a uniform temperature throughout the entire body of air passing through the calorimeter. A thermometer O is placed so as to record the temperature of the ingoing air and gas which are both of the same temperature, and a thermometer P is placed in the path of the outgoing products of combustion which consist almost entirely of heated air, owing to the large excess of air supplied. In order to avoid any calculation in connection with the reading of the apparatus, a sliding scale Q may be provided, with a reference arm or pointer R which can be adjusted to the level of the mercury in the thermometer O. It is obvious that by suitably calibrating the scale Q, and by adjusting the sliding scale so that the pointer R corresponds with the reading of the thermometer O, the heating value of the gas can be directly determined by the indication of the scale at the level of the mercury in the thermometer P.

The walls of the combustion chamber of the calorimeter can be suitably constructed for the purpose, and the proper insulating material used. The insulating material should be sufficiently effective to prevent all loss of heat by conduction or radiation from the sides of the apparatus, so that all heat would be carried away by the outgoing air.

The apparatus shown and described, it will be assumed, is properly constructed to produce the results. It is clear that a proportionate amount of gas and air will be discharged by the pump at any given speed of operation, and that the proportion will remain the same for any minor or moderate variation in the speed of the pump. Care, however, must be taken to see that the air and gas leading to the pump are supplied to it at practically the same pressure and temperature, it making no difference what these pressures and temperatures may be, so long as they are the same. Provision for causing the gas and air to be delivered to the pump at the same pressure and temperature being very simple and obvious, I have merely set forth in Fig. 2 one form of apparatus which might be used. From the pump or proportioning apparatus, the gas and air are discharged by way of the pipes 3 and 4, respectively, into the containers 5 and 6, which are simply elastic holders serving to absorb the irregularities in the flow of gas and air from the pump, due to its regular cycle of operation, but which do not, in any way, affect the proportion of gas or air as established in the pump or proportioning device. The air and gas are conducted from the containers to the calorimeter and the gas burned imparts its heat directly to the air, which is greatly in excess of that required to support combustion. This combustion takes place within the inclosing walls of the insulating material, and the air is caused to be thoroughly mixed with the products of combustion from the gas by the baffles 13. The thermometer O which is placed so as to indicate the temperature of the ingoing air and gas, which are of the same temperature, and the thermometer P which is placed in the path of the outgoing products of combustion which consist almost entirely of heated air, owing to the large excess of air supplied, will thus give the temperature of the air and products of combustion. It is evident that the difference in temperature between the ingoing and outgoing air is a direct measure of the heating value of the gas burned. Air under constant pressure has a definite specific heat, as has been set forth. There has also been established by the proportioning apparatus described, a definite volumetric ratio between the gas and air supplied to the calorimeter chamber. It is evident, therefore, that the rise in temperature is a direct indication of the heating value of the gas. It is further evident that if the scale Q is calibrated while the instrument is operated under constant conditions of temperature and pressure with regard to both gas and air supply, any change within practical limits of the pressure and temperature under which the gas and air are supplied, will not in any way affect the reading of the instrument, so long as the temperature and pressure of both gas and air are identical. For, if we assume that the temperature of the gas is higher than the standard temperature, this would have the effect of expanding the gas and the definite volumetric displacement would therefore have a smaller heating value, and would liberate less actual heat when burned in the calorimeter. However, the air supply is also at this same higher temperature and it is accordingly expanded and rarefied in exactly the same degree as the gas. It is evident, therefore, that the apparent specific heat of the air, that is to say, the heat absorbing capacity of the definite volume of air displaced would be diminished in exactly the same proportion as the apparent heating value of the gas has been diminished. Therefore, the smaller total quantity of heat liberated by this rarefied or expanded gas would be still sufficient to raise the likewise rarefied and expanded air by the same number of degrees as when the equipment was operating under standard conditions. It is also apparent that any variation from standard pressure would operate in exactly the same way, and an apparatus of this description would therefore correct automatically for variations of pressure and temperature from standard conditions, and when calibrated under standard conditions, the instrument would give readings in terms of standard gas at standard pressure and temperature, even when operated under conditions quite widely at variance with the standard.

From the foregoing it will be seen that I have used air as my heat absorbing medium, although some other gaseous medium might be employed. This method differs from the usual method employed in calorimetry, and especially where water is used as the heat absorbing medium. When water is employed as the absorbing medium, it is true that air is supplied to the calorimeter for the combustion of the gas and the air absorbs the heat, but this heat is immediately transmitted to the water, which is the final heat absorbing agent and from which the heat is measured. The air in this instance acts as a heat transmitting agent, serving to transfer the heat from the place of combustion to the water.

In my invention, the heat is finally absorbed and measured, either by the air in which it is burned, or by some other gaseous medium, to which it is transmitted from the air employed for combustion. The essential feature is that a gaseous medium, rather than a solid or liquid medium, be utilized for the final absorption and measurement of heat.

It will be apparent from the foregoing that the application of this principle could be accomplished with different appliances than that shown in the drawing, and hence I do not care to be limited or restricted in any wise to the apparatus herein described and shown in the drawing. Furthermore, different means can be provided for recording the temperature of the ingoing and outgoing air and gas.

Having fully described my invention, what I claim as new and desire to secure by Letters Patent, is:—

1. A method in the calorimetry of gaseous fuels, consisting in burning in a combustion chamber which is at atmospheric pressure gaseous fuels to heat a gaseous heat absorbing agent, the gaseous fuel and gaseous heat absorbing agent being supplied at varying pressures at proportionate rates and under varying temperatures, so long as the gaseous fuel and heat absorbing agent are supplied at the same temperature and at the same pressure, and ascertaining the rise in temperature of the heat absorbing agent and the products of combustion.

2. A method in the calorimetry of gaseous fuels, consisting of burning gaseous fuel in and with air, the gaseous fuel and air being proportioned before delivery and supplied at varying pressures and varying temperatures at proportionate rates to the apparatus under the same conditions of pressure and temperature, and ascertaining the rise in temperature of the air and products of combustion.

3. A method in the calorimetry of gaseous fuels, consisting in burning gaseous fuel in and with air in a combustion chamber which is at atmospheric pressure, the gaseous fuel and air being proportioned before delivery and supplied at proportionate rates and under the same conditions of pressure and temperature, and ascertaining the rise in temperature of the air and products of combustion.

4. A method in the calorimetry of gaseous fuels, consisting in burning gaseous fuel in and with a gaseous heat absorbing agent in a combustion chamber which is at atmospheric pressure, the gaseous fuel and gaseous heat absorbing agent being supplied at varying pressure at proportionate rates and under varying temperature, so long as the gaseous fuel and heat absorbing agent are supplied at the same temperature and same pressure; and ascertaining the rise in temperature of the heat absorbing agent and the products of combustion.

5. A method in the calorimetry of gaseous fuels, consisting in burning gaseous fuel in and with air in a combustion chamber, of an apparatus which is maintained at atmospheric pressure and maintains its contents at atmospheric pressure, gaseous fuel and air being supplied at varying pressures at proportionate rates and under varying temperatures, so long as the gaseous fuel and air are supplied at the same temperature and the same pressure, and ascertaining the rise in temperature of the air and the products of combustion.

6. A calorimeter comprising a combustion chamber, a power driven measuring apparatus for conducting continuously gas and air to the combustion chamber at proportionate rates, and means for ascertaining the rise in temperature of the outgoing air and products of combustion.

7. A calorimeter comprising a combustion chamber, a power driven measuring apparatus for supplying continuously air and gas to the combustion chamber at proportionate rates, and means for ascertaining the rise in temperature of the outgoing air and products of combustion.

8. A calorimeter comprising a combustion chamber, a power driven measuring apparatus for supplying continuously air and gas to the combustion chamber at proportionate rates, and means for ascertaining the difference in temperature between the ingoing air and gas and that of the outgoing air and products of combustion.

9. A calorimeter comprising a combustion chamber automatically maintained at atmospheric pressure and adapted to maintain its contents at atmospheric pressure, a power driven measuring apparatus for supplying continuously gas and air at proportionate rates to the combustion chamber, and means for ascertaining the rise in temperature of the out-going air and products of combustion.

10. A calorimeter comprising a combustion chamber, a power driven positive displacement pump for pumping air and gas continuously to the combustion chamber at proportionate rates, and means for ascertaining the rise in temperature of the outgoing air and products of combustion.

11. A method in the calorimetry of gaseous fuels, consisting in supplying a gaseous fuel and a gaseous heat absorbing agent to an apparatus at varying pressures at proportionate rates and under varying temperatures so long as the gaseous fuel and gaseous heat absorbing agent are supplied at the same temperature and the same pressure, and ascertaining the rise in temperature of the gaseous heat absorbing agent.

12. A calorimeter comprising a combustion chamber, a mechanically operated measuring apparatus for supplying continuously air and gas to the combustion chamber at proportionate rates, and means for ascertaining the rise in temperature of the outgoing air and products of combustion.

13. A calorimeter comprising a combustion chamber, a mechanically operated positive measuring apparatus for supplying continuously air and gas to the combustion chamber at proportionate rates, and means for ascertaining the rise in temperature of the outgoing air and products of combustion.

14. A calorimeter comprising a combustion chamber and a positive measuring apparatus for supplying continuously air and gas to the combustion chamber at proportionate rates, and means for ascertaining the rise in temperature of the outgoing air and products of combustion.

15. A calorimeter comprising a combustion chamber and a positive driven measuring apparatus for supplying continuously air and gas to the combustion chamber at proportionate rates, and means for ascertaining the rise in temperature of the outgoing air and products of combustion.

16. A method in calorimetry of gaseous fuels, consisting in burning gaseous fuel in and with air in a combustion chamber which is automatically maintained at atmospheric pressure, and maintaining its contents at atmospheric pressure, the gaseous fuel and air being supplied at proportionate rates under the same conditions of pressure and temperature, and ascertaining the rise in temperature of the air and products of combustion.

In testimony whereof I affix my signature in the presence of two witnesses.

HARRY F. SMITH.

Witnesses:
WM. H. EARHART,
SIDNEY EARHART.

Copies of this patent may be obtained for five cents each, by addressing the "Commissioner of Patents, Washington, D. C."